Patented Feb. 21, 1928.

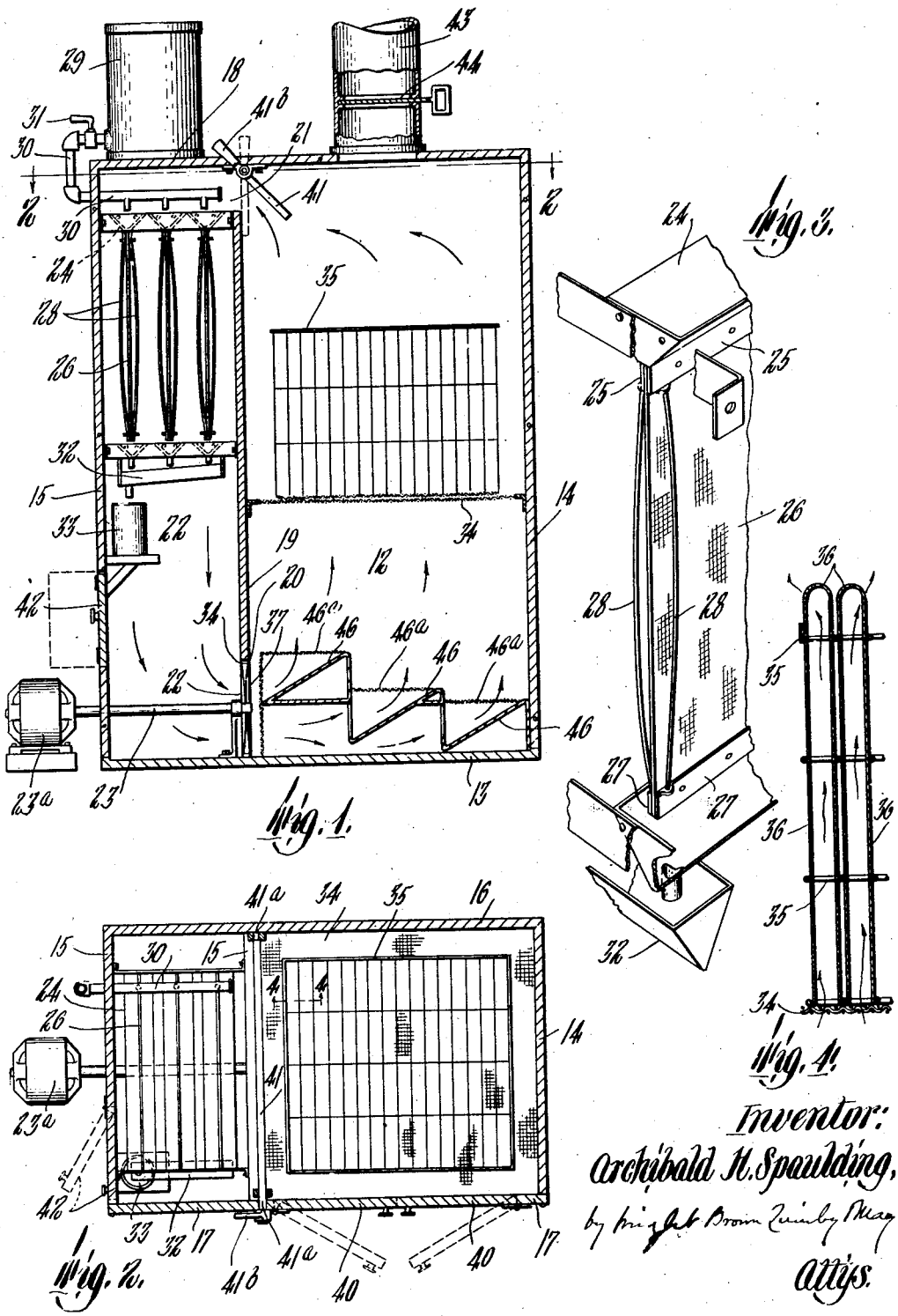
Feb. 21, 1928.
A. H. SPAULDING
PRINT DEVELOPING APPARATUS
Filed Feb. 25, 1927
1,659,841
2 Sheets-Sheet 1
Inventor:
Archibald H. Spaulding,

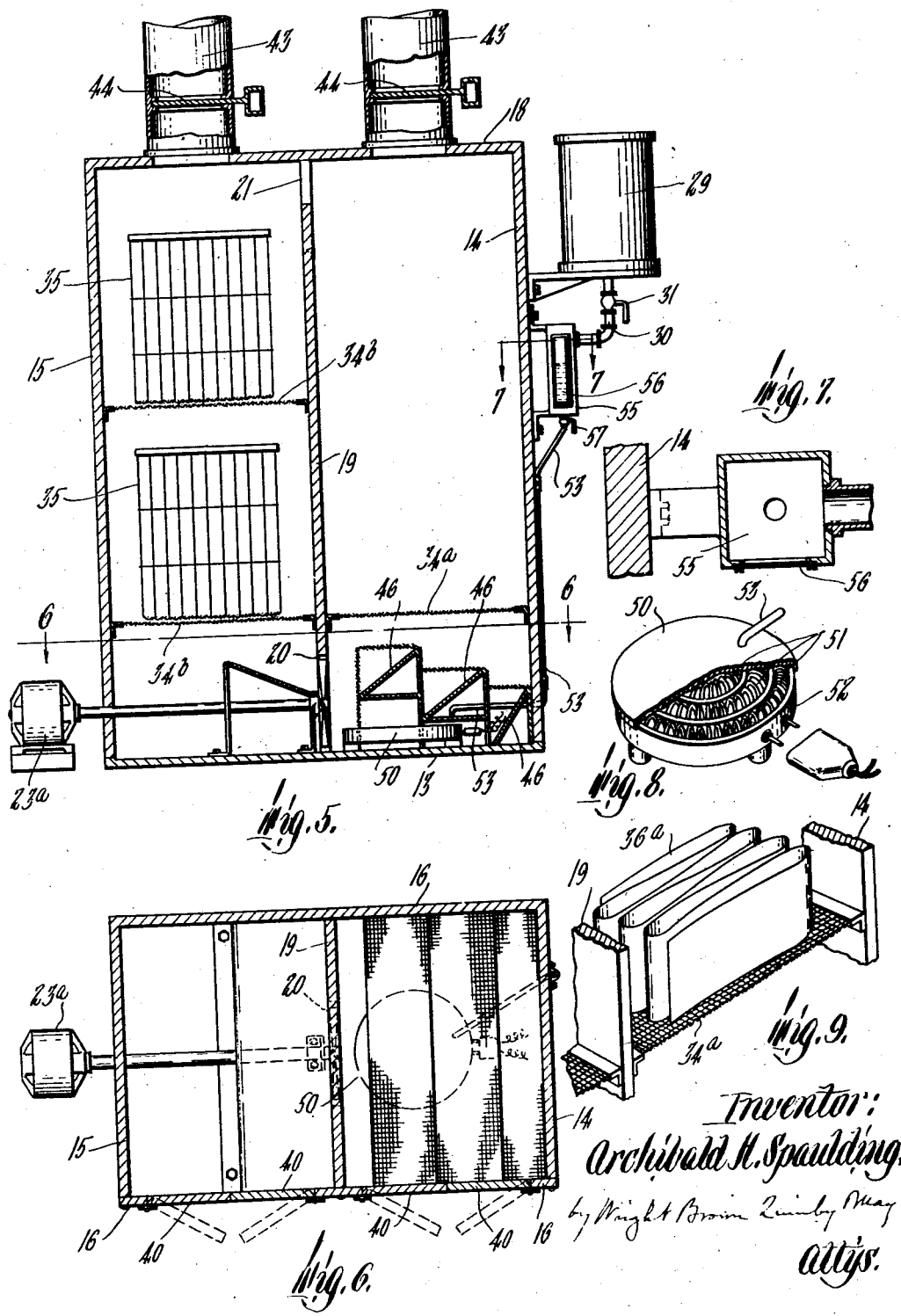

1,659,841

UNITED STATES PATENT OFFICE.

ARCHIBALD H. SPAULDING, OF HINGHAM, MASSACHUSETTS, ASSIGNOR TO SPAULD-ING-MOSS COMPANY, OF BOSTON, MASSACHUSETTS, A CORPORATION OF MASSA-CHUSETTS.

PRINT-DEVELOPING APPARATUS.

Application filed February 25, 1927. Serial No. 170,825.

This invention relates to apparatus for use in practising the so-called "ozalid" process, for developing on highly sesitized paper, prints made by exposure of the paper to light through a light transmitting sheet having opaque lines to be reproduced on the sensitized paper. In the ozalid process the sensitized paper is subjected, after exposure, to air charged with ammonia gas, or in other words, to an atmosphere of ammonia, the nature of the sensitized paper being such that the print is developed in a dry condition by the gas, no washing being required.

The general object of the invention is to provide a simple, efficient and conveniently operable ozalid print-developing apparatus including an air-confining chamber, having means for guiding air contained therein in a continuous path, air-forcing means adapted to move the contained air in said path, means for supporting sensitized paper in the path of the moving air, and charging means adapted to impregnate the moving air with ammonia gas.

Other objects will appear as the description proceeds.

Of the accompanying drawings forming a part of this specification,—

Figure 1 is a vertical sectional view, showing an apparatus embodying the invention, the chamber hereinafter described being shown in section.

Figure 2 is a section on line 2—2 of Figure 1, and a plan view of parts below said line.

Figure 3 is a fragmentary perspective view, showing a portion of the evaporator hereinafter described.

Figure 4 is an enlarged fragmentary section on line 4—4 of Figure 2.

Figures 5, 6, 7 and 8 show another and the preferred embodiment of the invention.

Figure 5 is a vertical sectional view.

Figure 6 is a section on line 6—6 of Figure 5.

Figure 7 is an enlarged fragmentary section on line 7—7 of Figure 5.

Figure 8 shows in perspective, and partly broken away, the evaporator shown by Figures 5 and 6.

Figure 9 is a fragmentary perspective view, showing a portion of a sensitized paper sheet supported by means shown by Figure 5.

The same reference characters indicate the same parts in all of the figures.

In the embodiment shown by Figures 1 to 4, inclusive, the apparatus includes an air-confining chamber, formed in this instance, by a horizontal bottom wall 13, two opposed upright side walls 14 and 15, two opposed upright end walls 16 and 17, and a horizontal top wall 18.

The chamber includes means for guiding the air contained therein in a continuous path. To this end the chamber is provided with an internal partition 19, subdividing the chamber into two chamber sections or compartments, and with air conduits at opposite ends of the partition, preferably formed by openings 20 and 21 in the partition. The arrangement is such that one of the chamber sections constitutes a flow passage, and the other a return passage, air forced as hereinafter described through the conduit 20, flowing in one direction to the conduit 21, and in the opposite direction from the conduit 21 back to the conduit 20. With the conduit 20 is associated an air-forcing means, preferably a fan 22, located in said conduit and fixed to a shaft 23, driven by a motor 23ª. The rotation of the fan causes a circulating current in the casing, as indicated by the arrows in Figure 1.

The apparatus includes charging means, adapted to impregnate the moving air with ammonia gas, so that a circulating atmosphere of ammonia may be maintained for any desired period, in the chamber, means being provided, as hereinafter described, for supporting sensitized paper in the path of the circulating atmosphere.

I prefer to charge the air by evaporating aqua ammonia in the chamber. To this end I provide in the chamber an evaporator, located in the path of the circulating air, and supply aqua ammonia to the evaporator from a reservoir outside the casing, through a conduit extending through a wall of the casing. The evaporator shown by Figures 1, 2 and 3, is located in one of the sections or compartments of the chamber, and is composed of a trough 24 fixed to the wall 15 and partition 19, sheet-clamping jaws 25

(Figure 3) below the trough and a vertically arranged sheet 26 of cotton cloth, or other suitable fabric, clamped at its upper end between the jaws 25, and suspended therefrom, the upper edge of the sheet being exposed to liquid in the trough, so that the liquid percolates through the sheet. To laterally confine the sheet 26 against loose sidewise movement, I provide clamping jaws 27 (Figure 3) between which the lower edge of the sheet is clamped, and rods 28 extending between and fixed to the jaws 25 and 27. It is desirable to provide a plurality of sheets 26 and holders therefor, as shown by Figure 1. Liquid may be supplied to the troughs 24 from an external reservoir 29, through a conduit 30 provided with a cock 31, which may be opened to start, and closed to stop the operation of the evaporator. Surplus liquid dropping from the lower ends of the sheets 26, may be conducted by inclined gutters 32 to an internal receptacle 33. Air circulated in the chamber is impregnated with ammonia gas, evaporated from the sheets 26.

The paper-supporting means includes, in this instance, an openwork support 34, preferably a horizontal partition of open mesh woven wire, through which the impregnated air may freely pass, attached to the chamber within one of the compartments or sections thereof, and an openwork portable receptacle or basket 35, subdivided to hold a plurality of sheets 36 of sensitized paper in the form of open bights or loops, the ends of the bights resting on the partition 34, so that the charged air may enter the bights and act on the inner surfaces thereof, as indicated by Figure 4. The receptacle rests loosely on the partition 34, and may be inserted and removed through a doorway in the wall 17, the doorway being provided with a closure, preferably formed by hinged doors 40.

To permit the discharge of the residual impregnated air from the chamber, after the developing process and before opening the chamber to remove the paper therefrom, I provide a hinged closure 41 for the conduit 21, an air inlet in the wall 15 normally closed by a hinged closure 42, and an outlet conduit 43, provided with a closure 44, the conduit discharging at a point sufficiently remote from the apparatus. When the conduit 21 is closed and the air inlet and the outlet conduit are opened, the fan 22 causes a flow of external air through the air inlet and from the section of the chamber containing the evaporator, to and through the conduit 22, and through the developing chamber to the outlet conduit, thereby carrying away the residual impregnated air, so that the developed paper may be removed without discomfort to the operator. The closure 41 is a swinging flap having trunnions journaled in bearings 41ª, one of the trunnions extending through an upright wall and having an operating handle 41ᵇ.

I provide means located in the path of the current of impregnated air, for distributing the current so that it acts uniformly on the paper supported in the chamber, said means being preferably embodied in a series of inclined baffle plates 46, arranged as shown by Figure 1, in the path of the current, and in woven wire members 46ª associated with said plates.

It will be seen that in the apparatus thus far described, the partition 19 subdivides the chamber into a larger compartment or section, in which the paper is supported, and a smaller compartment or section containing the evaporator.

In the preferred embodiment shown by Figures 5 and 6, the partition is centrally located in the chamber, so that the compartments or sections are of uniform size, each being provided with means for supporting the sensitized paper. In this instance, one of the chamber sections is provided with a single openwork partition section 34ª and the other chamber section is provided with two openwork partition sections 34ᵇ each supporting a portable paper receptacle 35. The partition section 34ª may support a paper sheet 36ª looped as shown by Figure 9, one edge of the looped sheet resting on the partition.

In this embodiment the evaporator and the baffle plates 46, which distribute the impregnated air are located below the openwork partition section 34ª the evaporator being located below the baffle plates.

The evaporator, in this instance, includes a horizontal metallic member 50, and means for heating the same, said means being embodied in a helically coiled and convoluted electrical resistance wire 51, supported by a base 52 which also supports the member 50, and rests on the bottom wall 13 of the chamber. The conduit 30 from the reservoir 29 has an extension 53, passing through the wall 14, and arranged to discharge aqua ammonia upon the heated member 50, the result being a quick evaporation of the liquid. The resulting gas impregnates the moving air, and the impregnated air is distributed and circulated through the sections of the chamber, as in the embodiment first described.

The outlet for residual impregnated air may be composed of two conduits 43, each having a closure 44. To facilitate the discharge, each outlet conduit 43 may be provided with suction means (not shown). The conduit from the reservoir 29 to the evaporator may include means for permitting the delivery of only a predetermined quantity of liquid to the evaporator, at each operation of the apparatus. To this end, I interpose between the conduit 30 and extension 53 thereof, a measuring section 55, coupled at its upper end to the conduit 30, and at its lower end to the extension 53, and provided with a liquid-tight sight opening including a glass closure 56. The extension 53 is provided with a cock 57 below the measuring section. The glass closure is provided wth a vertical series of graduations by which the level of the liquid in the measuring section may be determined.

The cock 57 is closed when the measuring section is being charged. The cock 31 is then closed, and when the apparatus is operated, the cock 57 is opened. When a predetermined quantity of liquid has been delivered to the evaporator, the cock 57 is closed, and the generation of gas by the evaporator is stopped.

I claim:

1. A developing apparatus comprising an air-confining chamber having means for guiding air contained therein in a continuous path, air-forcing means adapted to move the contained air in said path, means for supporting sensitized paper in the path of the moving air, and charging means adapted to impregnate the moving air with ammonia gas.

2. A developing apparatus comprising an air-confining chamber having means for guiding air contained therein in a continuous path, air-forcing means adapted to move the contained air in said path, means for supporting sensitized paper in the path of the moving air, charging means adapted to impregnate the moving air with ammonia gas, and means for starting and stopping the operation of the charging means, the chamber being provided with an outlet for residual impregnated air, a doorway for the insertion and removal of the paper, and independently operable closures for said outlet and doorway, the arrangement being such that the outlet may be opened to permit the discharge of residual impregnated air before the opening of the doorway, and the removal of the developed paper therethrough.

3. A developing apparatus comprising an air-confining chamber having means for guiding air contained therein in a continuous path, air-forcing means adapted to move the contained air in said path, means for supporting sensitized paper in the path of the moving air, an evaporator in the path of the moving air, and means for delivering aqua ammonia to the evaporator.

4. A developing apparatus comprising an air-confining chamber having means for guiding air contained therein in a continuous path, air-forcing means adapted to move the contained air in said path, means for supporting sensitized paper in the path of the moving air, an evaporator in the path of the moving air, a reservoir for aqua ammonia outside the chamber, a conduit extending from the reservoir to the evaporator through a wall of the chamber, and a cock in said conduit whereby the flow of liquid therethrough may be started and stopped.

5. A developing apparatus comprising an air-confining chamber having means for guiding air contained therein in a continuous path, air-forcing means adapted to move the contained air in said path, means for supporting sensitized paper in the path of the moving air, charging means adapted to impregnate the moving air with ammonia gas, and means for distributing the current of impregnated air on its way to the supported paper.

6. A developing apparatus comprising an air-confining chamber having means for guiding air contained therein in a continuous path, air-forcing means adapted to move the contained air in said path, an evaporator in the path of the moving air, means for delivering aqua ammonia to the evaporator to cause impregnation of the moving air with ammonia gas, and an openwork support in the chamber arranged to support sensitized paper in the path of the impregnated air.

7. A developing apparatus comprising an air-confining chamber having means for guiding air contained therein in a continuous path, air-forcing means adapted to move the contained air in said path, an evaporator in the path of the moving air, means for delivering aqua ammonia to the evaporator to cause impregnation of the moving air with ammonia gas, an openwork support in the chamber arranged to support sensitized paper in the path of the impregnated air, and a portable openwork paper receptacle removably seated on the support, said receptacle including means for holding a plurality of paper sheets in the form of open bights.

8. A developing apparatus comprising an air-confining chamber having an internal partition subdividing the chamber into two sections, and provided at opposite ends of the chamber with air conduits connecting the sections, so that one constitutes a flow passage, and the other a return passage, air-forcing means associated with one of the conduits, to force air therethrough, and create a circulating current in the chamber sections, and charging means adapted to impregnate the circulating air with ammonia gas, the chamber being provided with means for supporting sensitized paper in the path of the circulating impregnated air.

9. A developing apparatus comprising an air-confining chamber having an internal partition subdividing the chamber into two storage sections, and provided at opposite ends of the chamber with air conduits connecting the sections, so that one constitutes a flow passage, and the other a return passage, air-forcing means associated with one of the conduits to force air therethrough and create a circulating current in the chamber sections, each section having an openwork supporting section adapted to support sensitized paper in the path of the circulating current, and charging means adapted to impregnate the circulating air with ammonia gas.

10. A developing apparatus comprising an air-confining chamber having means for guiding air contained therein in a continuous path, air-forcing means adapted to move the contained air in said path, an evaporating member in the path of the moving air, means for heating said member, means for delivering aqua ammonia to the heated evaporating member, and means for supporting sensitized paper in the path of the moving impregnated air.

11. A developing apparatus comprising an air-confining chamber having means for guiding air contained therein in a continuous path, air-forcing means adapted to move the contained air in said path, an evaporator in the path of the moving air, a reservoir for aqua ammonia outside the chamber, a conduit extending from the reservoir to the evaporator through a wall of the chamber, said conduit including a measuring section having a liquid tight graduated sight opening and cocks at opposite ends of the measuring section.

In testimony whereof I have affixed my signature.

ARCHIBALD H. SPAULDING.